United States Patent [19]
Lin

[11] Patent Number: 5,844,788
[45] Date of Patent: Dec. 1, 1998

[54] VOLTAGE OSCILLATING CIRCUIT AND METHOD

[75] Inventor: Jong-Yen Lin, Hsinchu, Taiwan

[73] Assignee: Industrial Technology Research Institute, Hsinchu, Taiwan

[21] Appl. No.: 692,504

[22] Filed: Aug. 5, 1996

Related U.S. Application Data

[63] Continuation of Ser. No. 43,439, Apr. 5, 1993.

[51] Int. Cl.$^6$ .................................................... H02M 5/45
[52] U.S. Cl. ................................ 363/37; 363/57; 363/58
[58] Field of Search .................................. 363/34, 36, 37, 363/57, 89, 58, 95, 65, 96, 136

[56] References Cited

U.S. PATENT DOCUMENTS

| | | | |
|---|---|---|---|
| 4,746,814 | 5/1988 | Shigekane | 307/255 |
| 4,814,962 | 3/1989 | Magalhaes et al. | 363/16 |
| 5,402,329 | 3/1995 | Wittenbreder, Jr. | 363/16 |

*Primary Examiner*—Shawn Riley
*Attorney, Agent, or Firm*—Bo-In Lin

[57] ABSTRACT

The present invention comprises a circuit for generating a large-amplitude oscillating voltage. The circuit includes a power supply means for providing an input voltage and a power supply switching means including a solid state relay (SSR) connected to the power supply means for switching on and off the power supply means. The circuit further includes an voltage oscillating means connected to the power supply switching means to be activated by the input voltage and a voltage regulating means connected in series between the power supply switching means and the voltage oscillating means for regulating the input voltage. The circuit further includes a gate driver means connected in parallel between the power supply means and the voltage oscillating means for generating a driving voltage to the voltage oscillating means for generating the large-amplitude oscillating voltage when the solid state relay is switched on.

11 Claims, 2 Drawing Sheets

(12) United States Patent

VOLTAGE OSCILLATING CIRCUIT AND METHOD

This application is a continuation of application Ser. No. 08/043,439 filed Apr. 5, 1993.

BACKGROUND OF THE INVENTION

1. Field of the Invention

This invention relates generally to the voltage oscillating circuit and method. More particularly, this invention relates to the voltage oscillating circuit and method capable of responding to sudden current or voltage changes in a stable manner whereby the oscillating circuit is prevented from being damaged by the exceedingly high induced voltage or current.

2. Description of the Prior Art

An oscillator circuit, especially the oscillator for generating a high voltage output are often vulnerable to the overflow damages caused by high voltage/current spurts induced by sudden power input changes. One specific example is shown in an ozone generator 10 in FIG. 1 wherein high oscillating output voltages are generated to produce a sequence of electric arches in an ozone chamber whereby ozone gas is produced. The ozone generator 10 comprises a power supply 12 to provide twenty-four direct-current (DC) volts to a voltage regulator 14 and a positive/negative fifteen DC volts to a gate driver 16. The oscillator is activated by a twenty four DC volts relay 18 which is connected to an AC power supply 20 via a breaker 22. The voltage from the AC power supply 20 is provided to the oscillator through a three-phase bridge diode 24 wherein a fan 26 is used to aid the heat dissipation of the bridge diode 24 and four silicon controlled rectifiers (SCRs). There are four SCRs, i.e., SCRs 62,64, 66 and 68 which will be described below.

The input current provided to the oscillator is controlled by the voltage regulator 14 and a field-effect transistor (FET) 42 which receives a voltage input in the fifth pin of the voltage regulator 14 through two one-hundred ohms/fifty watts power supply lines 44 and 46 which are connected in parallel. An FET current begins to flow through the FET 42 when the fifth pin of the voltage regulator 14 which is connected to the gate of the FET 42 has a positive voltage. A 0.1-ohm/1-watt connector 48 between the second pin and the fifth pin of the voltage regulator 14 is used as a FET current detector 48 to cutoff the FET current when the current flows through the FET 42 exceeds a predefined value. A capacitor 52 which has a capacitance of 1500 micro farads over a voltage of 455 volts is then charged by the current flows through the current detector 48. The voltage which is filtered by the capacitor 52 is then provided to the oscillator as the input voltage.

The gate driver 16 is connected to four silicon controlled rectifiers (SCRs) 62,64,66, and 68 through four rectifier connecting lines 72, 74, 76, and 78 respectively. The gate driver 16 deliver an activating voltage of 10 KHz to initiate the four SCRs 62, 64, 66, and 68. An oscillating voltage is generated wherein the current first flows through the SCR 62 and SCR 64 when SCRs 62 and 64 are simultaneously activated by an initiating voltage received from the gate driver 16. The current passes through the SCR 62, a voltage transformer 82, a choke coil 84, and the SCR 64 to form a close circuit. Due to the inductive voltages generated by the transformer 82 and the choke coil 84, the current is reduced to an equilibrium 'holding current'. The voltage at the gate drive 16 activates SCRs 66 and 68 which generate a voltage to cut off the current through the SCRs 62 and 64. Similarly, the current passes through SCR 66, the choke coil 84, the transformer 82 and the SCR 68 to form a close circuit. The current again is reduced to an equilibrium holding current due to the inductive voltages generated in the choke coil 84 and the transformer 82. The SCRs 62 and 64 are then activated. An oscillating voltage of 10 KHz is thus generated at the transformer 82. The amplitude of the output oscillating voltage is further increased to eighty-thousand volts through a voltage transformer 82 for input to the ozone chamber (not shown).

Once the connection to the power supply 12 is disconnected by switching off the relay 18, the capacitor 52 starts to discharge gradually through a resistor 84 which has a resistance of 15 mega ohms. However, if the relay 18 is switched to the on position again before the electric charges on the capacitor 52 is totally discharged, the SCRs 62, 64, 66, and 68 are easily activated by the noise signals from the relay 18 because the residual voltage on the capacitor 52 is still imposed on the SCRs. A short circuit is formed over the SCRs 62, 64, 66, and 68 because there is no corresponding negative load voltage from the voltage transformer 82 to turn off the current through these SCRs. An overflow current is generated which may damage the FET 42 thus directing the current to flow through the two 100 ohms/50-watts lines 44 and 46. The overflow current through the short circuits from these two parallel lines 44 and 46 may soon damages the SCRs and the entire oscillating circuit.

SUMMARY OF THE PRESENT INVENTION

It is therefore an object of the present invention to provide an oscillating circuit for generating large-amplitude oscillating voltage with current overflow protection whereby the limitations as encountered by the prior art can be overcome.

Another object of the present invention is to provide an oscillating circuit for generating large-amplitude oscillating voltage with solid state relay (SSR) to minimize the noise signals thereby reducing the probability that the oscillating circuit being inadvertently activated.

Another object of the present invention is to provide an oscillating circuit for generating large-amplitude oscillating voltage with filtering capacitor to filter the noises generated by the power supply.

Another object of the present invention is to provide an oscillating circuit for generating large-amplitude oscillating voltage with a protective fuse to shut-off the power supply once a current overflow occurs thereby the damages to the oscillating circuit are minimized.

Briefly, in a preferred embodiment, the present invention comprises a circuit for generating a large-amplitude oscillating voltage. The circuit includes a power supply means for providing an input voltage and a power supply switching means including a solid state relay (SSR) connected to the power supply means for switching on and off the power supply means. The circuit further includes a voltage oscillating means connected to the power supply switching means to be activated by the input voltage and a voltage regulating means connected in series between the power supply switching means and the voltage oscillating means for regulating the input voltage. The circuit further includes a gate driver means connected in parallel between the power supply means and the voltage oscillating means for generating a driving voltage to the voltage oscillating means for generating the large-amplitude oscillating voltage when the solid state relay is switched on.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 3 shows the voltage and current variations of SCR1 and SCR2 as a function of time;

DETAILED DESCRIPTION OF THE PREFERRED EMBODIMENT

Figure 2:
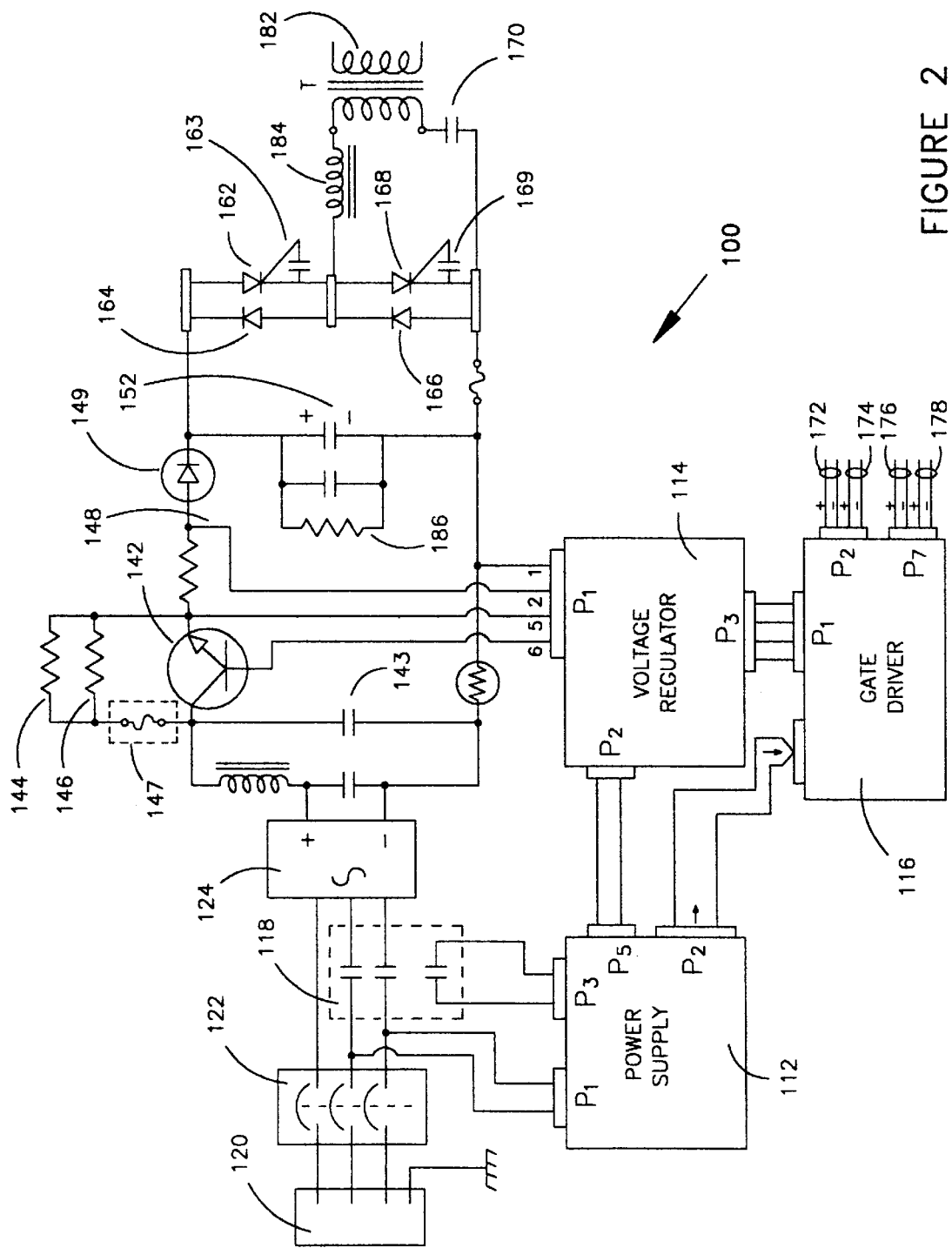
FIG. 2 is a circuit diagram of an ozone generator comprises a circuit for generating a large-amplitude oscillating voltage according to the present invention.

FIG. 2 is a circuit diagram of an ozone generator 100 comprises an oscillating circuit and the stabilizing and protective circuits according to the present invention. The ozone generator 100 comprises a power supply 112 to provide a twenty-four direct-current (DC) volts to a voltage regulator 114 and a positive/negative fifteen DC volts to a gate driver 116. The oscillator is activated by a twenty four DC-volts solid state relay 118 instead of a mechanical relay as used in the prior art. Unlike the mechanical relay, no mechanical movements are involved in turning on or turning off the switches and therefore the signal noises produced by the power-switch actions by the solid state relay (SSR) 118 are much lower than that produced the mechanical switches. Accidental activations of the oscillating circuits caused by the signal noises due to the power-switching actions are therefore prevented.

The input current provided to the oscillator is controlled by the voltage regulator 114 and a NPN transistor 142 instead of the field-effect transistor (FET) as used in the prior art. The NPN transistor 142 is less costly and more readily available than the FET transistor. The collector of the NPN transistor 142 receives a voltage input from the sixth pin of the voltage regulator 114 through two one-hundred ohms/fifty watts resistors 144 and 146 connected in parallel and a two-ampere fuse 147. The two-ampere fuse protects the oscillating circuits from damages when a short circuit current-overflow occurs. The two-ampere fuse 147 also provides a means for isolating and identifying the problems which may occur in the generator 100 so that the repairing process of the generator 100 may be expedited. A capacitor 143 which has a capacitance of thirty micro farads over an maximum operational voltage of three-hundred-fifty volts is also provided between the voltage regulator 114 and the collector of the transistor 142 to provide a noise filter whereby the likelihood of an accidental activation of the transistor 142 by the noise signals is reduced.

An emitter current begins to flow through the NPN transistor 142 when the fifth pin of the voltage regulator 114 which is connected to the collector of the transistor 142 has a positive voltage. A 0.1-ohm/1-watt connector 148 between the second pin and the fifth pin of the voltage regulator 114 is used as a transistor current detector 148 to cutoff the emitter current when the current flows through the transistor 142 exceeds a predefined value. A capacitor 152 which has a capacitance of 1500 micro farads over a voltage of 455 volts is then charged by the current flows through the current detector 148. A diode 149 is provided between the current detector 148 and the capacitor 152. The diode 149 prevents feedback voltage from the oscillating voltage to cause damages to the transistor 142 should a short circuit in the oscillating circuit occur. The voltage is first filtered by a capacitor 152 and then provided to the oscillator as the input voltage.

The gate driver 116 is connected to two silicon controlled rectifiers (SCRs) 162, and 166 through two rectifier connecting lines 172 and 176 respectively. The gate driver 116 deliver an activating voltage of 10 KHz to initiate the two SCRs 162 and 168 which are serially connected to a capacitor 170 which has a capacitance of two micro farads over a maximum operational voltage of eight hundred volts. An oscillating voltage is generated wherein the current first flows through the SCR 162 when it is activated by an initiating voltage generated by the gate driver 116. The current flows through the SCR 162, a choke coil 184, a transformer 182, and the capacitor 170. The charging current to the capacitor 170 is gradually reduced because the negative inductive voltages generated at the choke coil 186 and the transformer 182. It causes the current flowing through the SCR 162 to be cut off. Meanwhile, the capacitor 170 is charged to a voltage which is equal to the source voltage. The gate driver 116 then generates another initiating signal which activates the SCR 168. The capacitor 170 is now charged by a current flowing from the transformer 182 to the choke coil 186 then the SCR 168. Similarly, the charging current is gradually reduced because of the negative inductive voltages in the choke coil 184 and the transformer 182 which then causes the SCR 168 to cut off the current while the capacitor is charged to a full voltage. An oscillating voltage of 10 KHz is thus generated. The amplitude of the output oscillating voltage is further increased to eighty-four thousand volts through a voltage transformer 182 for input to the ozone chamber (not shown).

Figure 1:
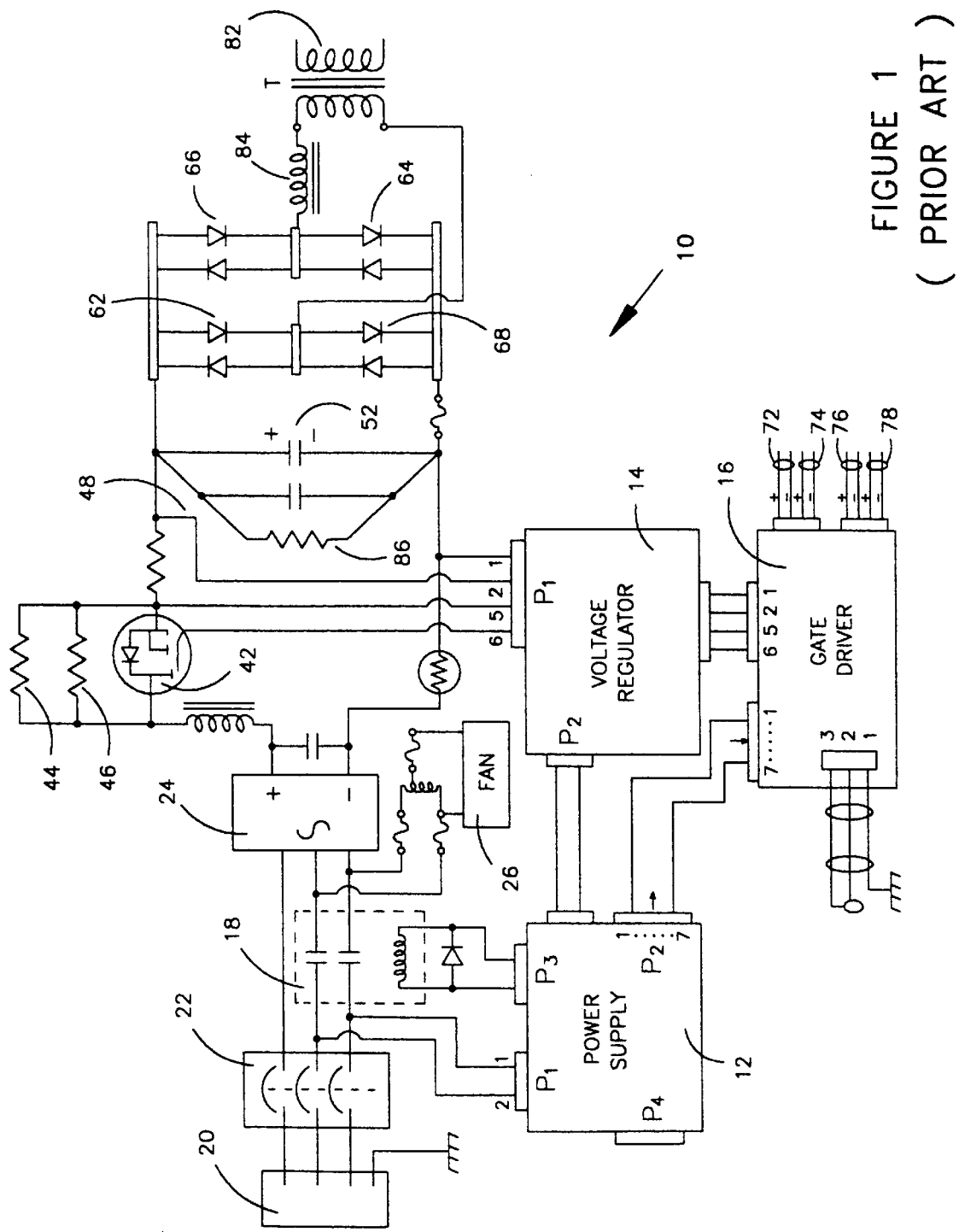
FIG. 1 is a circuit diagram of an ozone generator comprises a prior art oscillating circuit.

The bridge oscillator as used in the prior art is now replaced by a capacitor type oscillator which requires only two SCRs thus reduces the cost of the oscillating circuit than that of the prior art. Meanwhile, unlike the SCRs used in the bridge type oscillator wherein the SCR holding current must be kept above two-hundred-fifty millie amperes otherwise the SCR current can not be turned off and the transistor, i.e., the FET in FIG. 1, will be shortened and damaged by over-current. In the capacitor type oscillator as shown, any silicon controlled relay (SCR) which allows 50 mA of current or more can function properly for the present invention. The limitations of requiring the more specific types of SCRs as utilized in the prior art are therefore removed.

Once the connection to the power supply 112 is disconnected by switching off the relay 118, the capacitor 152 starts to discharge gradually through a resistor 184 which has a resistance of 15 Mega ohms. If the relay 118 is switched to the on position again before the electric charges on the capacitor 152 is totally discharged, the SCRs 162 and 166 are prevented from being inadvertently activated by signal noises from the switching action of the SSR 118 because the solid state switch (SSR) 118 which generates very low signal noises is used to replace the mechanical switch used in the prior art. Current overflow over the SCRs 162 and 168 caused by short-circuit of these two SCRs is also prevented because there is a parallel capacitor 176 to receive the electric charge. Meanwhile, as the capacitor 176 is gradually charged, it generates a voltage which also reduces the current that flows through the SCRs. An current overflow damage is thus prevented.

Connected in parallel but of opposite polarity between the input and the output ends of the two SCRs, i.e., SCR 162 and SCR 168 are two diodes 164 and 166 respectively. The diodes 164 and 166 serve to isolate the voltage imposed on these two SCRs from the high voltage transformer 182 as the input voltage is being turned on or off. Additional protection is provided for the SCRs 162 and 168 by adding two noise filtering branches at the output end of these two SCRs, i.e., a capacitor 163 at the output end of SCR 162 and a capacitor 169 at the output end of SCR 168. The likelihood that the SCRs 162 and 168 be inadvertently activated by the noise signals generated by sudden variations of the current in the circuit is further reduced because the noises are filtered by these two capacitors 163 and 169.

Therefore the problems as encountered in the prior art are resolved in the present invention by the use of the solid state switch 118 and the parallel capacitor 170. The damages which may be caused by a current overflow in the oscillating circuit is prevented by various protective circuit means described above. Meanwhile, if a current overflow occurs, the two-ampere fuse is first broken to create an open circuit. Further damages to other circuit are prevented. It also keeps the repair and diagnosis tasks simple whereby a higher availability of the ozone with lower maintenance cost are achieved.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A circuit for generating a large-amplitude oscillating voltage comprising:

a power supply means for providing an input voltage;

a non-bridge capacitor-type non-resonant voltage oscillating means for generating said large-amplitude oscillating voltage;

a power supply switching means including a solid state relay (SSR) connected between said power supply means and said voltage oscillating means for switching on and off said voltage oscillating means from said power supply means;

a voltage regulating means connected in series between said power supply switching means and said voltage oscillating means for regulating said input voltage;

a gate driver means connected in parallel between said power supply means and said voltage oscillating means for generating a driving voltage to said voltage oscillating means for generating said large-amplitude oscillating voltage when said solid state relay is switched on for controlling a frequency of said large-amplitude oscillating voltage;

said voltage oscillating means further includes a SCR-capacitor-choke oscillating circuit including a first SCR, a second SCR, a common capacitor-choke circuit including a capacitor and a choke connected in series wherein said common capacitor-choke circuit being connected in parallel to said first and said second SCRs where said first SCR connected to a first end of said voltage regulating means and said second SCR connected to the opposite end of said voltage regulating means; and said first SCR, said common capacitor-choke circuit forming a first SCR-capacitor-choke branch and said second SCR, said common capacitor-choke circuit forming a second SCR-capacitor-choke branch wherein said common choke generating an opposite inductive voltage in each of said branches for alternately charging said common capacitor thus generating said oscillating voltage of opposite signs in each of said branches whereby said first and second SCRs being provided in said circuit for generating large oscillating voltage without a requirement to sustain a minimum relay current as required by a bridge type oscillator.

2. The circuit for generating a large-amplitude oscillating voltage of claim 1 further comprises:

an oscillator protection means connected in series between said power supply switch means and said voltage regulating means for protecting said oscillating means from being damaged by current overflow.

3. The circuit for generating a large-amplitude oscillating voltage of claim 2 wherein:

said oscillator protection means further comprises a current fuse for breaking the current loop upon an occurrence of current overflow.

4. The circuit for generating a large-amplitude oscillating voltage of claim 3 wherein:

said voltage oscillating means further includes a transformer circuit opposite a choke circuit and said transformer circuit converts said oscillating voltages in SCR-capacitor-choke branches to said large-amplitude oscillating voltages.

5. The circuit for generating a large-amplitude oscillating voltage of claim 4 further comprises:

a capacitor filtering means connected in parallel between said power supply switching means and said voltage oscillating means for reducing signal noises transmitting from said power supply switching means to said voltage oscillating means.

6. The circuit for generating a large-amplitude oscillating voltage of claim 5 wherein:

said voltage oscillating means further includes a first diode connected in parallel but of opposite polarity to said first SCR between the input end and the output end of said first SCR and a second diode connected in parallel but of opposite polarity to said second SCR between the input end and the output end of said second SCR wherein said first and second diode further isolates said first and second SCRs from a voltage variation from said transformer circuit.

7. The circuit for generating a large-amplitude oscillating voltage of claim 6 wherein:

said voltage oscillating means further includes a first filtering branch including a first capacitor connected at the output end of said first SCR and a second filtering branch including a second capacitor connected at the output end of said second SCR whereby noise signals are filtered before reaching said first and second SCRs.

8. A circuit for generating a large-amplitude oscillating voltage comprising:

a power supply means for providing an input voltage;

a non-bridge capacitor-type non-resonant voltage oscillating means for generating said large-amplitude oscillating voltage;

a power supply switching means including a solid state relay (SSR) connected between said power supply means and said voltage oscillating means for switching on and off said voltage oscillating means from said power supply means;

said voltage oscillating means further includes a SCR-capacitor-choke oscillating circuit including a first SCR, a second SCR, a capacitor and a choke circuit wherein said capacitor and said choke forming a common circuit connecting to said first and said second SCRs where said first SCR connected to a first end of said voltage regulating means and said second SCR connected to the opposite end of said voltage regulating means;

said first SCR, said capacitor and said choke circuit forming a first SCR-capacitor-choke branch and said second SCR, said capacitor and said choke circuit forming a second SCR-capacitor-choke branch wherein said choke circuit generating an opposite inductive voltage in each of said branches for alternately charging said capacitor thus generating said oscillating voltage of opposite signs in each of said branches whereby said first and second SCRs being provided in said circuit for generating large oscillating voltage without a requirement to sustain a minimum relay current as required by a bridge type oscillator;

said voltage oscillating means further includes a transformer circuit opposite said choke circuit and said transformer circuit converts said oscillating voltages in said SCR-capacitor-choke branches to said large-amplitude oscillating voltages;

said voltage oscillating means further includes a first diode connected in parallel but of opposite polarity to said first SCR between the input end and the output end of said first SCR and a second diode connected in parallel but of opposite polarity to said second SCR between the input end and the output end of said second SCR wherein said first and second diode further isolates said first and second SCRs from a voltage variation from said transformer circuit;

a capacitor filtering means connected in parallel between said power supply switching means and said voltage oscillating means for reducing signal noises transmitting from said power supply switching means to said voltage oscillating means;

a voltage regulating means connected in series between said power supply switching means and said voltage oscillating means for regulating said input voltage;

an oscillator protection means connected in series between said power supply switch means and said voltage regulating means for protecting said oscillating means from being damaged by current overflow, said oscillator protection means including a current fuse for breaking the current loop upon an occurrence of current overflow; and a gate driver means connected in parallel between said power supply means and said voltage oscillating means for generating a driving voltage to said voltage oscillating means for generating said large-amplitude oscillating voltage when said solid state relay is switched on for controlling a frequency of said large-amplitude oscillating voltage.

9. A method for protecting a large-amplitude oscillating voltage generator including a power supply means for providing an input voltage to a non-bridge capacitor-type non-resonant voltage oscillating means comprising the steps of:

(a) utilizing a power supply switching means including a solid state relay (SSR) for connecting to and for switching on and off said power supply means;

(b) connecting a voltage regulating means in series between said power supply switching means and said voltage oscillating means for regulating said input voltage;

(c) connecting a capacitor filtering means in parallel between said power supply switching means and said voltage oscillating means for reducing signal noises transmitting from said power supply switching means to said voltage oscillating means;

(d) connecting an oscillator protection means in series between said power supply switch means and said voltage regulating means for protecting said oscillating means from being damaged by current overflow, said oscillator protection means including a current fuse for breaking the current loop upon an occurrence of current overflow;

(e) connecting a gate driver means in parallel between said power supply means and said voltage oscillating means for generating a driving voltage to said voltage oscillating means for generating said large-amplitude oscillating voltage when said solid state relay is switched on for controlling a frequency of said voltage oscillating means;

(f) utilizing in said voltage oscillating means a SCR-capacitor-choke oscillating circuit including a first SCR, a second SCR, a common capacitor-choke circuit including a common capacitor and a common choke connected in series wherein said capacitor and said choke forming wherein said a common capacitor-choke circuit connected in parallel to said first and said second SCRs where said first SCR connected to a first end of said voltage regulating means and said second SCR connected to the opposite end of said voltage regulating means; and (g) configuring said first SCR, said common capacitor-choke circuit in forming a first SCR-capacitor-choke branch and said second SCR and said common capacitor-choke circuit in forming a second SCR-capacitor-choke branch wherein said common choke generating an opposite inductive voltage in each of said branches for alternately charging said common capacitor thus generating said oscillating voltage of opposite signs in each of said branches whereby said first and second SCRs being provided in said circuit for generating large oscillating voltage without a requirement to sustain a minimum relay current as required by a bridge type oscillator.

10. The method for protecting a large-amplitude oscillating voltage generator of claim 9 further comprises the steps of:

(h) configuring said voltage oscillating means to include a transformer circuit opposite said choke circuit and said transformer circuit for converting said oscillating voltages in said SCR-capacitor-choke branches to said large-amplitude oscillating voltages.

11. The method for protecting a large-amplitude oscillating voltage generator of claim 10 further comprises the steps of:

(i) configuring said voltage oscillating means to include a first diode connected in parallel but of opposite polarity to said first SCR between the input end and the output end of said first SCR and a second diode connected in parallel but of opposite polarity to said second SCR between the input end and the output end of said second SCR wherein said first and second diode further isolates said first and second SCRs from a voltage variation from said transformer circuit; and (j) configuring said voltage oscillating means to further include a first filtering branch including a first capacitor connected at the output end of said first SCR and a second filtering branch including a second capacitor connected at the output end of said second SCR whereby noise signals are filtered before reaching said first and second SCRs.

* * * * *